March 31, 1964 — R. E. SHENBERGER — 3,127,092
MOTOR MOUNTING
Filed July 3, 1961
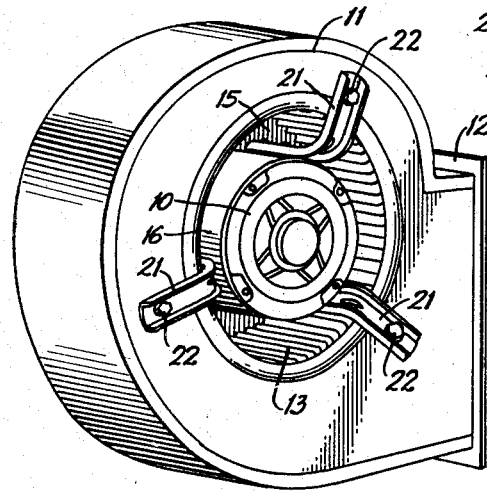
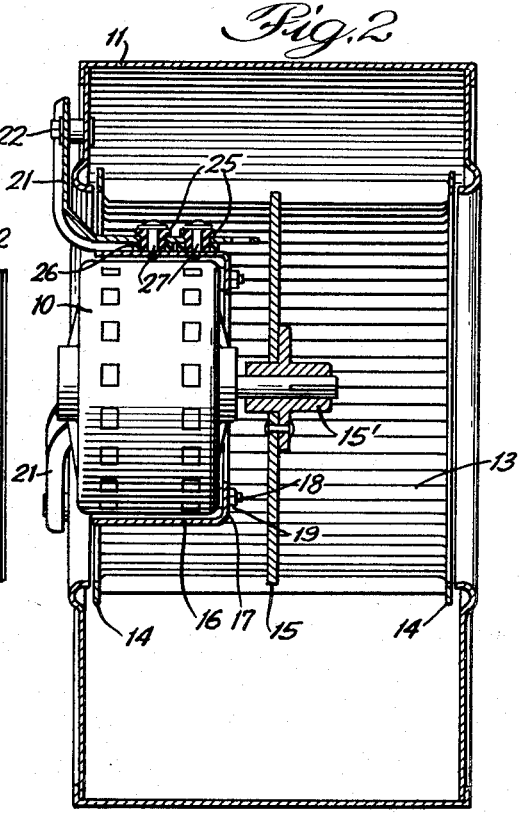
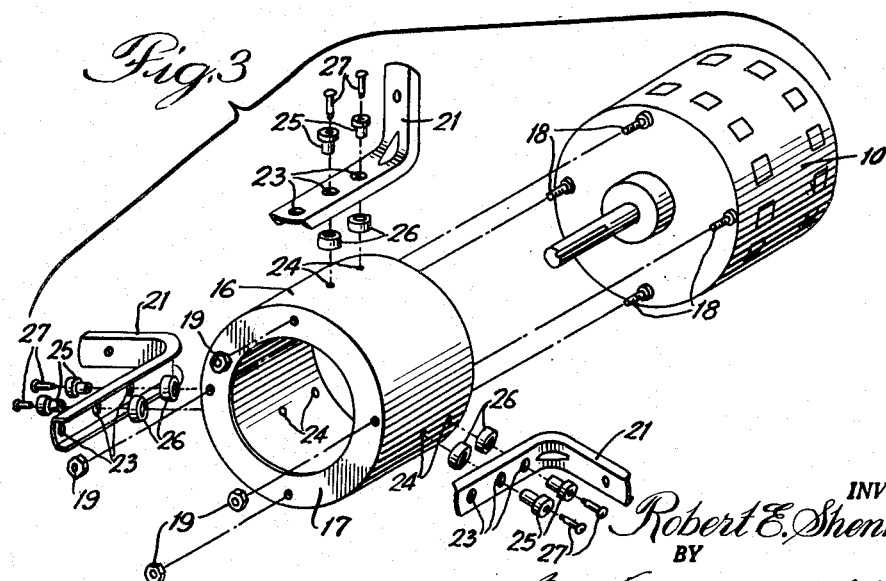
INVENTOR:
Robert E. Shenberger,
BY
ATTORNEYS.

United States Patent Office 3,127,092
Patented Mar. 31, 1964

3,127,092
MOTOR MOUNTING
Robert E. Shenberger, Park Forest, Ill., assignor to Rheem Manufacturing Company, Chicago, Ill., a corporation of California
Filed July 3, 1961, Ser. No. 121,654
6 Claims. (Cl. 230—117)

This invention relates to motor mountings and more particularly to a mounting for motors in centrifugal type blower housings.

Many different types of centrifugal blowers have been constructed with the motor mounted in an open end of the blower housing within the blower wheel or rotor and directly connected thereto. In such blowers the motor has conventionally been mounted by a bracket assembly consisting of metal straps bolted or welded together in a spider-like design and gripping the motor at each of its ends. Such assemblies are relatively difficult and expensive to make and to assemble on the blower because of the large amount of labor required. Furthermore, such assemblies do not have a high degree of rigidity and are subject to vibration and noise during operation of the blower.

It is accordingly an object of the present invention to provide a motor mounting which is simple and inexpensive to construct and assemble on the blower and which provides an extremely rigid support for the motor.

Another object is to provide a motor mounting which incorporates simple and inexpensive but highly efficient resilient mounts for the motor to absorb vibration thereof.

According to a feature of the invention the motor is rigidly secured in a cup member which is connected through resilient connectors to supporting arms rigidly attached directly to the housing.

The above and other objects and features of the invention will be more readily apparent from the following description when read in connection with the accompanying drawing in which:

FIGURE 1 is a perspective view of a blower equipped with a motor mount embodying the invention;

FIGURE 2 is an axial section through the blower and motor mount; and

FIGURE 3 is a disassembled perspective view of the motor and mount.

The motor mount of the present invention is adapted to support a motor indicated at 10 within the open end of a conventional centrifugal blower housing. As shown, the blower housing 11 is formed of sheet metal with its ends open and with a spiral outer wall terminating in a connector flange 12. Within the housing there is a blower wheel or rotor including a plurality of spaced axially extending blades 13 lying in annular array within the blower housing and extending between the openings in the ends thereof adjacent to the periphery of the openings. The blades are connected at their ends by narrow annular rings 14 which lie closely adjacent to the interior of the housing and by a central disc or spider 15 terminating in a hub 15' through which the rotor is driven.

According to the present invention the motor 10 is supported within the blower housing by a motor mount including a sheet metal cup member 16 having a cylindrical side wall and a flat annular end 17 leaving a central opening therethrough. The motor fits within the cup member and is rigidly secured therein by through bolts 18 extending beyond one end of the motor through openings in the annular end wall 17 of the cup member and secured thereto by nuts 19. The bolts 18 may be the conventional through bolts which secure the end members of the motor thereto and may simply be extended at one end of the motor for mounting it in the cup member 16. The cup member is of a slightly larger diameter than the motor so that the motor will fit into it with a small peripheral clearance and may be substantially as long as the motor or shorter than the motor as desired.

For supporting the cup member within the blower housing a plurality of supporting arms 21 are provided which are angularly bent as shown. One leg of each of the arms 21 extends along the outside of the cup member in angularly spaced relation to each other with the other legs of the supporting arms extending radially out from the motor and cup member to overlie the end wall of the blower housing and to be rigidly secured thereto by bolts or similar fastenings 22. In this way the motor is accurately supported centrally of the housing so that its shaft may extend through the opening defined by the annular end wall 17 and be connected directly to the hub 15' as shown in FIGURE 2.

The supporting arms are preferably resiliently connected to the cup member to absorb vibration induced during operation of the blower. For this purpose as best seen in FIGURE 3, each of the supporting arms is provided with spaced openings 23 which may register selectively with corresponding openings 24 in the side wall of the cup member. It will be noted that two openings 24 are provided in each set as shown while there are three openings 23 thereby to permit the supporting arms to be connected to the cup member in different positions to fit different sized blowers.

Bushings 25 formed of a material sufficiently hard to withstand the shear effect during motor operation extend through the openings 23 and are formed with enlarged heads to engage the outer surfaces of the supporting arms around the openings. The bushings are of a length appreciably greater than the thickness of the supporting arms and their inner ends between the supporting arms and the side wall of the cup member 16 are surrounded by relatively soft, resilient collars 26. Preferably, the bushings 25 are made of a relatively hard rubber or rubber-like material, such as a plastic, while the collars 26 are made of a softer rubber or rubber-like material or plastic to be sufficiently yieldable to absorb vibration. Fastenings 27, such as rivets or bolts, extend through the bushings 25 and are rigidly secured to the side wall of the cup member. As shown, the fastenings are in the form of headed and shouldered rivets having reduced ends of a size to extend through the openings 24 and be riveted over the inside of the cup member although other types of fastenings could be employed as desired.

It will be seen that in accordance with the present invention the construction of the motor mount is simple and inexpensive and the parts thereof can easily be assembled with a minimum of labor. To mount the motor it is necessary only to secure it in the cup member and then to secure the supporting arms 21 to the blower housing by means of the fastenings 22. When so mounted, the motor will be securely and accurately held in proper centered position in the blower housing and due to the resilient connectors provided by the bushings 25 and collars 26 will absorb minor vibrations so that the blower will operate quietly and efficiently.

While one embodiment of the invention has been shown and described in detail, it will be understood that this is illustrative only and is not to be taken as a definition of the scope of the invention, reference being had for this purpose to the appended claims.

What is claimed is:

1. A motor mount comprising in combination with a motor having a shaft projecting from one end thereof a cup member having a cylindrical side wall and an annular end wall, the side wall being of a size to receive the motor loosely with said one end thereof engaging the end wall and with the motor shaft extending through the open central portion of the end wall, means securing said end of the motor to the end wall and constituting the sole mounting for the motor a plurality of angular rigid supporting arms having one end thereof extending along the side wall in angularly spaced relation and the other ends extending radially outwardly from the motor for connection to a support, and resilient means connecting the arms to the side wall.

2. A motor mount comprising in combination with a motor having a shaft projecting from one end thereof a cup member having a cylindrical side wall and an annular end wall, the side wall being of a size to receive the motor with one said end thereof engaging and secured to the end wall and with the motor shaft extending through the open central portion of the end wall, a plurality of supporting arms extending along the side wall in angularly spaced relation, there being aligned openings in the arms and side wall, bushings extending through the openings in the arms, fastenings extending through the bushings and the openings in the side wall securing the bushings to the side wall, and yielding collars around the bushings between the arms and the side wall.

3. The construction of claim 2 in which the bushings are of relatively hard rubber to withstand shear forces and the collars are of relatively soft rubber.

4. In combination with a blower having a housing formed with a peripheral outlet and a central opening in at least one end, a hollow rotor in the housing rotatable about an axis concentric with said central opening, a motor lying concentrically within said opening and connected to the rotor to drive it, and a motor mount comprising a cup member having a cylindrical side wall and an annular end wall, the side wall fitting around the motor with the end wall engaging and secured to one end of the motor, a plurality of angular supporting arms having one end extending along the side wall of the cup member in angularly spaced relation and with the other ends extending radially outward into overlying relationship with said one end of the housing and secured to the housing, and means securing said one end of the arms to the cup member.

5. In combination with a blower having a housing formed with a peripheral outlet and a central opening in at least one end, a hollow rotor in the housing rotatable about an axis concentric with said central opening, a motor lying concentrically within said opening and connected to the rotor to drive it, and a motor mount comprising a cup member having a cylindrical side wall and an annular end wall, the side wall fitting around the motor with the end wall engaging and secured to one end of the motor, a plurality of angular supporting arms having one end extending along the side wall of the cup member in angularly spaced relation and with the other ends extending radially outward into overlying relationship with said one end of the housing and secured to the housing, said one ends of the arms being formed with mounting openings, bushings extending through the mounting openings, fastenings extending through the bushings and secured to the side wall of the cup member, and collars of yielding material around the bushings between the supporting arms and the side wall of the cup member.

6. The construction of claim 5 in which the bushings are of relatively hard rubber and the collars are of softer rubber.

References Cited in the file of this patent

UNITED STATES PATENTS 2,157,609   Hopkins _____ May 9, 1939

FOREIGN PATENTS 811,248   France _____ Apr. 9, 1937